United States Patent [19]

Bartelink

[11] Patent Number: 5,029,037
[45] Date of Patent: * Jul. 2, 1991

[54] SAFE MAINS VOLTAGE SUPPLY OUTLET AND METHOD

[75] Inventor: E. H. B. Bartelink, Concord, N.H.

[73] Assignee: Academy of Applied Science, Inc., Concord, N.H.

[*] Notice: The portion of the term of this patent subsequent to Nov. 14, 2006 has been disclaimed.

[21] Appl. No.: 418,854

[22] Filed: Oct. 10, 1989

Related U.S. Application Data

[63] Continuation-in-part of Ser. No. 208,268, Jun. 17, 1988, Pat. No. 4,888,660.

[30] Foreign Application Priority Data

Jun. 16, 1989 [JP] Japan ................................ 1-154368
Jul. 26, 1989 [EP] European Pat. Off. ......... 89306179.6

[51] Int. Cl.$^5$ ............................................. H02H 3/16
[52] U.S. Cl. ............................................ 361/49; 361/42
[58] Field of Search ..................... 361/42, 45, 46, 47, 361/48, 50

[56] References Cited

U.S. PATENT DOCUMENTS

| | | | |
|---|---|---|---|
| 4,442,470 | 4/1984 | Miscenik | 361/46 |
| 4,709,293 | 11/1987 | Gershen et al. | 361/50 |
| 4,888,660 | 12/1989 | Bartelink | 361/42 |
| 4,947,278 | 8/1990 | Nichols, III | 361/46 |

Primary Examiner—Todd E. DeBoer
Assistant Examiner—Jeffrey A. Gaffin
Attorney, Agent, or Firm—Rines and Rines

[57] ABSTRACT

An improved mains outlet and method of operating the same that automatically and safely distinguishes between the conditions of human or animal contact with the outlet terminals and contact with appliances such as light bulbs and consumer products, to prevent any substantial voltage or power from being drawn in the former case and automatically applies substantially full mains voltage when the appliance is connected to the outlet, including appliances presenting inductive loads. Use with ground fault detector systems is also feasible.

9 Claims, 5 Drawing Sheets

*VOLTAGES SHOWN ARE "OPEN CIRCUIT" VOLTAGES.
(NO LOAD PLUGGED INTO UNIT 122)

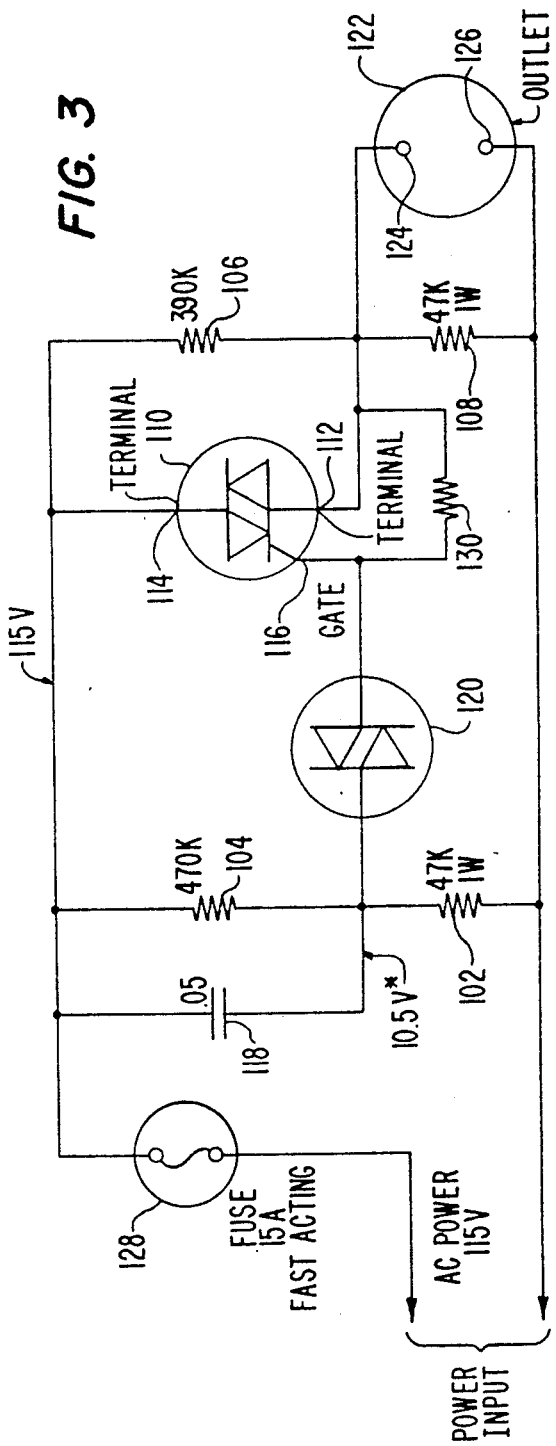

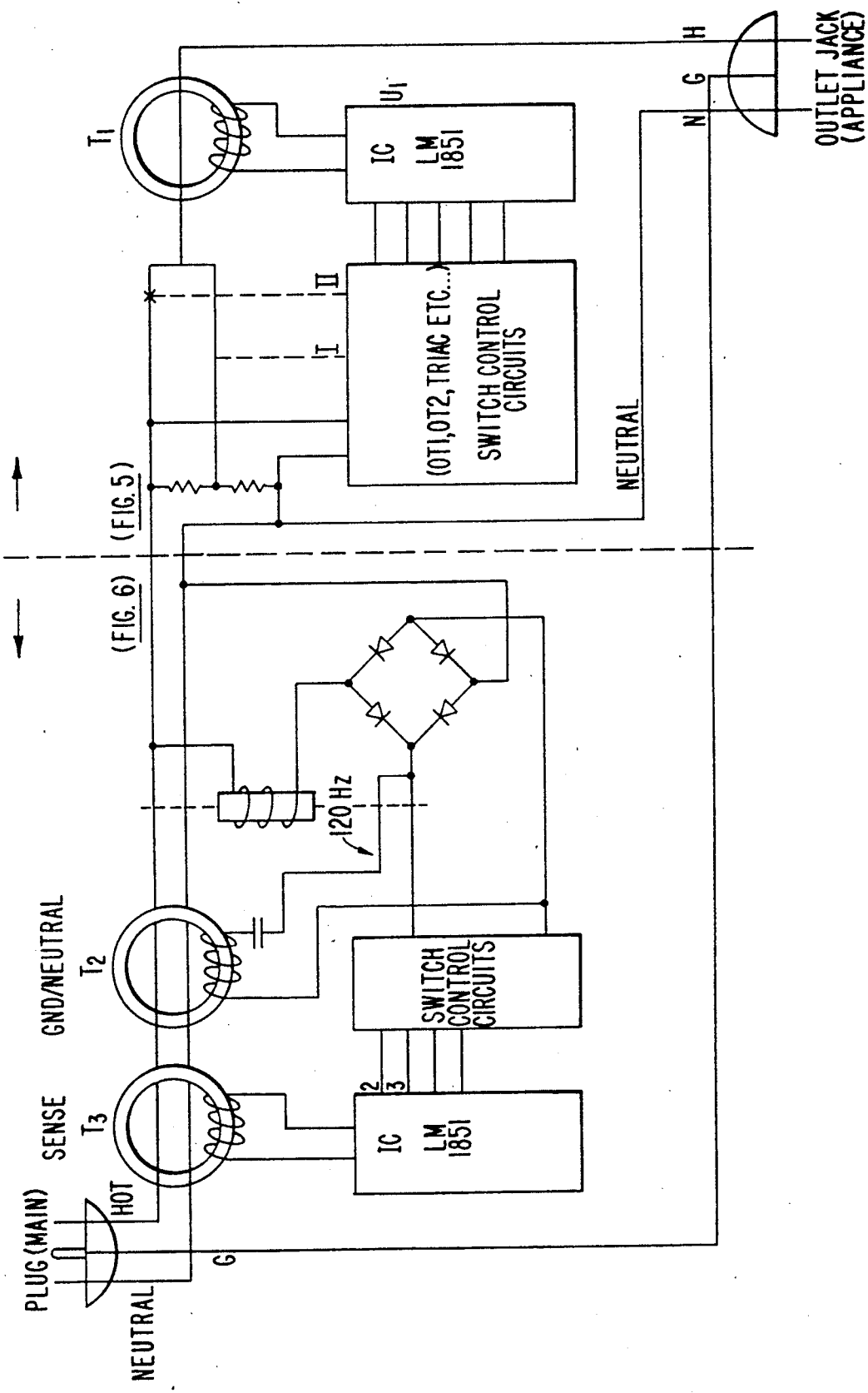

SAFE MAINS VOLTAGE SUPPLY OUTLET AND METHOD

This application is a continuation-in-part of parent U.S. patent application Ser. No. 208,268, filed June 17, 1988, for Shock-Proof Mains Voltage Supply Outlet and Method now U.S. Pat. No. 4,888,660 issued Dec. 19, 1989.

The present invention relates to mains voltage supply outlets used to connect movable appliances to the source of power. This includes those outlets of the type used in residences, offices, businesses, hotels and in public places, to power household and other appliances ranging from lamps to vacuum cleaners, heaters, toasters, hair dryers and similar devices; and is more particularly directed to insuring the safety of such outlet from electrical shock by the inadvertent or misguided purposeful touching of the outlet terminals by children, animals or adults, as may be encountered through insertion of paper clips or nails or even small fingers into outlet apertures and into contact with the metal terminals of the outlet.

Numerous devices have been evolved over the years for mitigating against such dangers including the current use of fixed or movable plastic inserts to cover the outlet apertures and mechanical on-off switches—both requiring human operation or control. Illustrative of prior approaches or attempts at improved plugs and the like are U.S. Pat. Nos. 3,169,239; 3,368,110; 3,441,799; 3,706,008; 3,864,581; 3,909,566; 4,080,640; 4,175,255; 4,306,374; 4,484,185; 4,584,430; and 4,722,021. Most of these devices show methods of disconnecting power from the appliance in case of overload or describe mechanical devices to prevent inadvertent contact with the source of power.

Underlying the invention of said parent application is the concept of employing appropriate electronic circuits connected between the mains supply lines and the outlet terminals that, in effect, respond automatically to the impedance presented between the outlet terminals unambiguously to distinguish between a condition where the human body is connected thereto and the condition where an electrical appliance that is to be powered is so connected —insuring automatically that a trivial, entirely safe amount of voltage or power is available in the former case, and substantially full power is connected to the appliance in the latter instance. Though such concept is generically applicable, specific voltage dividing sensing of the impedance presented between the outlet terminals was stressed in said parent application, as later described.

There are occasions, however, where appliances may present inductive loads (such as certain motors) of a nature that can cause deleterious phase shifts; and the present invention is directed to improved versions of the said concept using current sensing to determine the impedance at the outlet terminals and which admirably accommodates for such inductive loads.

An object of the invention, accordingly, is to provide a new and improved mains outlet and method of operating the same that obviate the above-described problems and automatically and safely distinguish between the conditions of human or animal contact with the outlet and appliance contact therewith to prevent any substantial voltage or power being drawn in the former case and to apply substantially full mains voltage in the latter condition and to effect the same with current sensing of the impedance presented t the outlet terminals that accommodates for all types of appliances-to-be-powered including those presenting inductive loads.

Another object is to provide such a safe outlet that may also be incorporated into ground fault detector systems.

Other and further objects will be explained hereinafter and are more fully delineated in the appended claims.

In summary, from one of its broader aspects, the invention embraces a method of rendering an outlet connected to a mains power supply safe from shock upon human touching of the outlet terminals, that comprises, current-sensing the impedance presented between said outlet terminals; responding to said sensing to apply a very small or trivial "safe" amount of voltage and power from said supply for sensed impedance values corresponding to the relatively high impedance presented by the human body, wet or dry; and responding to said current-sensing to apply substantially full supply voltage for sensed impedance values corresponding to the relatively low impedance presented by appliances, including those providing inductive loads. Preferred and best mode apparatus and details are hereinafter presented.

The invention will now be described with reference to the accompanying drawings, FIG. 1 of which, as described in said parent application, is a simplified circuit diagram of a part of a circuit useful for the purposes of the invention and which is exemplary, though a voltage-dividing impedance-sensing illustration, to explain the generic principles underlying the invention;

FIG. 3 is a preferred voltage-dividing impedance-sensing implementation of the invention;

Figure 5:
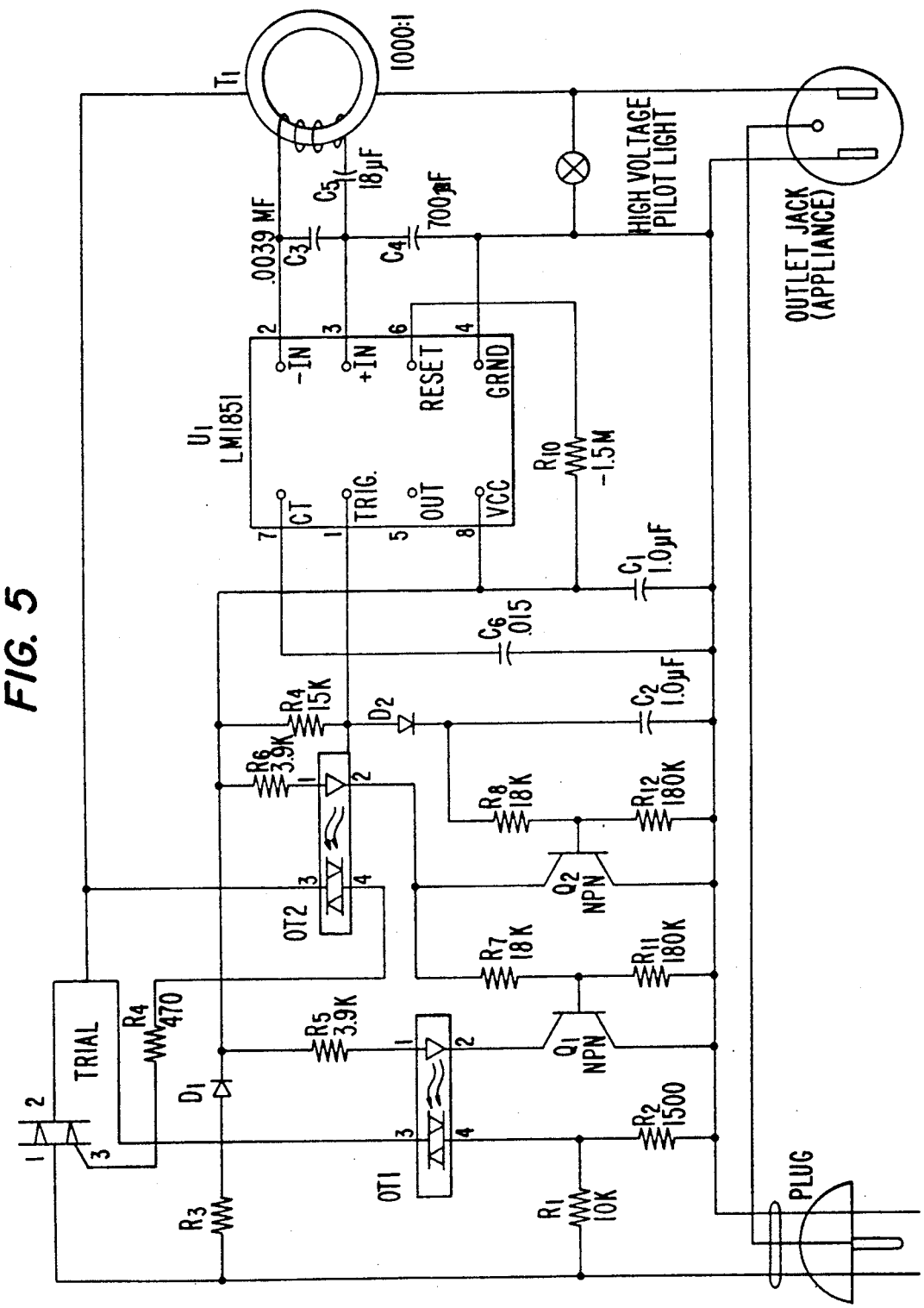
Figure 6:
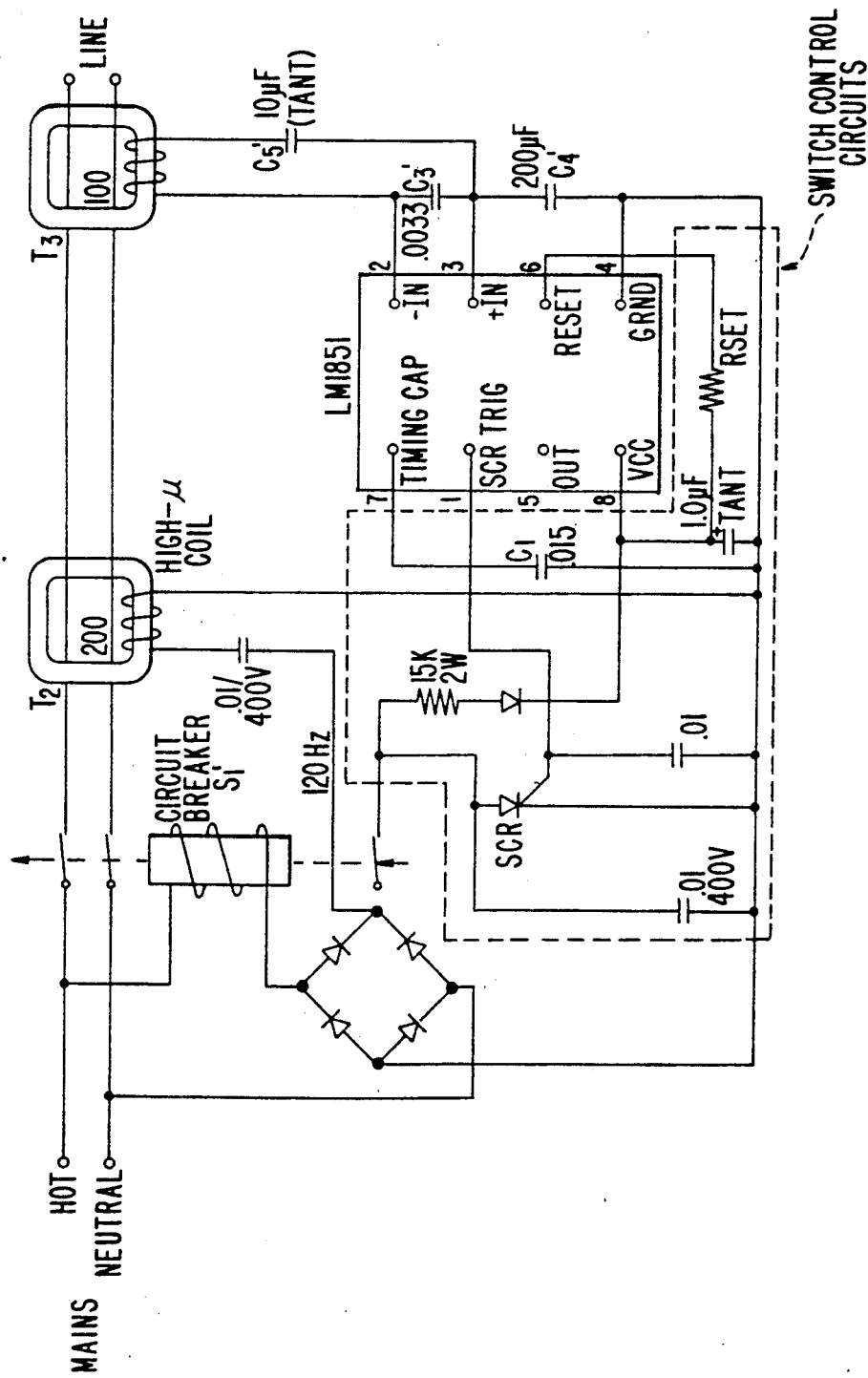

FIG. 5 is a circuit diagram of the preferred current-sensing embodiment of the present application; and FIG. 6 is a diagram illustrating a conventional ground fault interrupter and grounded neutral detector of a ground fault detector system which can be subject to unsafe conditions; and FIG. 7 is a diagram illustrating the incorporation of the safe outlet system of the invention, of the type shown in FIG. 5 hereof, in such ground fault detector to imbue it with the safety features of the invention herein.

Figure 1:
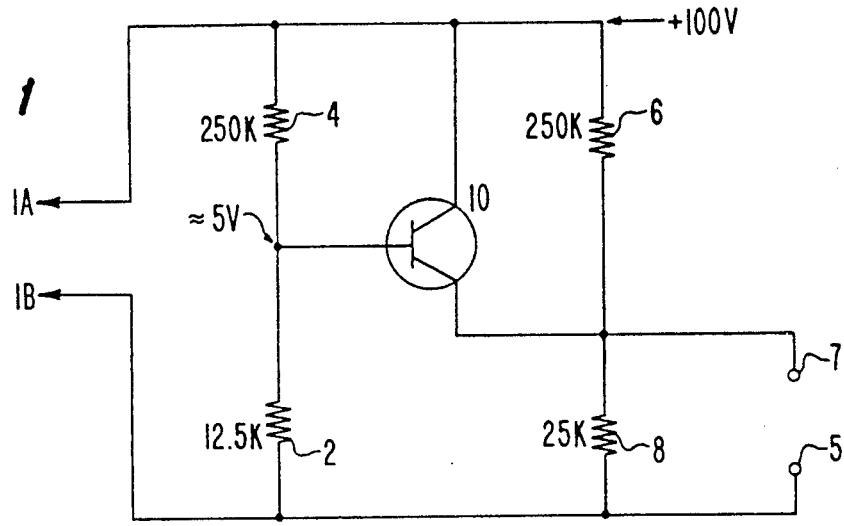

Referring to FIG. 1, some of the principles underlying the invention will be explained in simplified fashion, even though the circuit of FIG. 1 is not commercially adapted for operation without additional refinements as later explained. In this FIG. 1, as explained in said parent application, there is shown a transistor 10 which has its base biased to, for example, +5 volts by resistor 4, which may, for example, be of the order of 250,000 ohms and a resistor 2 which may have a much lesser value of the order of 12,500 ohms, thus reducing the voltage at the base of the transistor to about the said +5 volts. The emitter of this transistor is biased by resistor 6, which may also have a value of the order of 250,000 ohms, and resistor 8, which may be of the order of 250,000 ohms, resulting in an emitter voltage of about +10 volts. Thus the transistor 10 cannot conduct and the voltage at the terminals 7 and 5, which represent the outlet, will remain at a trivial value of only a small fraction of the mains supply voltage such as about 10 volts. So long as the transistor 10 does not conduct, the maximum current from the mains supply 1A and 1B, such as the 110–115 volt or 220 volt supplies used throughout the world, which can flow to terminals 5 and 7 is of the order of a totally safe 0.40 milliamperes. When the external resistance applied to terminals 5 and 7 of the outlet is reduced far below the resistance values of the human body, becomes less than about, say, 500 ohms, the emitter voltage falls below the base voltage and the transistor 10 will conduct. There is then the classical case of an emitter follower operation, wherein the voltage across the outlet terminals 5 and 7 will be equal to the 5-volt base voltage appearing in transistor 10.

The above explains the basic operation of the electronic switching system of the circuit interposed between the mains supply lines 1A and 1B and the outlet terminals 7 and 5, though in actual practice, non-linear devices must be incorporated to produce full power at the terminals 5 and 7 when the impedance presented across the outlet terminals 5 and 7 is less than a relatively low value, of at most a few hundred ohms as prescribed by an appliance.

In accordance with the invention, the outlet 5–7 is rendered safe from shock upon human touching of the outlet terminals 5 and 7 through the interposition of the electronic impedance or resistance sensing and switching circuit such as that in FIG. 1 interposed between the outlet terminals 5 and 7 and the power supply lines 1A and 1B. The electronic switching device 10 of the circuit, as above indicated, is biased to permit no or a trivial and safe amount of voltage and thus power to be passed through the circuit from the power supply lines 1A and 1B to the outlet terminals 5 and 7 when the impedance between the terminals 5 and 7 is relatively high, say of the order of the impedance of the human body when fingers, wet or dry, are touched to the terminals 5 and 7, thereby to prevent any shock. This is somewhat analogous to the trivial voltage applied to toy electric railroad tracks and trains which has long been recognized as a totally safe condition, even for children touching the terminals. As previously indicated, these relatively high impedances have been measured to be of the order of from hundreds of thousands of ohms to several megohms, depending upon the wet or dry condition of the fingers or the portion of the body that becomes connected between the outlet terminals 5 and 7. When, however, a load impedance is sensed across the terminals 5 and 7 that is relatively low compared to the above, say, in practice, for lamps and similar electrical devices of the order of a few hundred ohms and less, the above-mentioned condition of conduction of the transistor 10 takes place and the mains voltage is then applied with substantially full power available to energize the appliance that has been plugged into the outlet as previously described.

Figure 2:
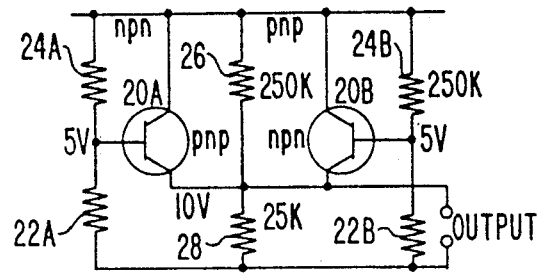
FIGS. 2 and 4 are similar circuit diagrams of modifications.

The circuit of FIG. 1 has been described in simplified form in connection with the positive cycles of the supply voltage applied at the lines 1A and 1B. In order not to lose the energy of the negative half-cycles, this circuit may be combined with a complementary circuit (transistors 20A and 20B) as shown in FIG. 2 to accommodate for the negative half-cycles as well. If a circuit which is symmetrical to ground is desired, the circuit of FIG. 4 containing transistors 30A, 30B, 30C and 30D and corresponding resistor networks 32A through D, 34A through D, 36A and 36B and 38A and 38B may be employed.

In preferred form, however, the switching devices can assume the form of triacs and diacs, which are not polarity sensitive and therefore there is no need to provide multiple circuits such as shown in FIG. 2 to take care of the condition of both the positive and negative polarity half-cycles. Furthermore, mains plug outlets are normally wired with a ground and a hot conductor, at least in the United States, and there is no need to provide a balanced output in such instances.

The preceding has described the transistor circuits in which the resistor 6 of FIG. 1, for example, will deliver very small current into the high impedance load of the human body touching the outlet and in which the transistor 10 in switching to conduction will deliver additional current of the type necessary to enable powering of a low output impedance device, such as appliance, when it is applied to the outlet terminals 5 and 7. The additional current thus applied to the low impedance device is limited because, in the emitter-follower circuit of FIG. 1, the current in the transistor cannot rise beyond the point where the voltage across the emitter circuit equals the voltage at the base. Thus, in a commercially useful system, to develop effective power in the output circuit for powering the desired appliance when plugged into the outlet terminals 5 and 7, the transistors are supplemented with or preferably replaced by non-linear devices such as the triac and diac type electronic switching illustrated in FIG. 3. Referring to that figure, the triac 110 replaces the transistor 10 of FIG. 1. The triac has terminals 112, 114 and 116. In the data sheets these are generally referred to respectively as "Main Terminal-1" (112), "Main Terminal-2" (114) and "Gate" (116). Critical voltages are the voltages occurring between terminals 112 and 116. The triac, of course, is a device which in its idle condition has a high impedance between its main terminals 112 and 114, and which can be switched to a low impedance device by applying a voltage pulse of a magnitude which exceeds the voltage at the terminal 112 and causes the switching of the triac. This conversion will take place with supply voltage of either polarity.

A voltage divider consisting of resistors 102 and 104 is installed at the gate side and another voltage divider consisting of resistors 106 and 108 is installed in the "mains terminal" side of the circuit. The junction of resistors 106 and 108 is connected to the "Main Terminal-1" (112), and to the output terminal 124 of the outlet shown at 122. The junction of resistors 102 and 104 is connected to the gate 116 of the triac serially through a diac 120, having the property that it presents a very high impedance to currents of either polarity until the voltage across the same has reached a certain threshold; and then, when that voltage is exceeded, the diac becomes a very low impedance device. When the voltage across the diac is reduced to either zero or to a very low value, it reconverts into a high impedance device. As a result of these properties, the diac prevents any significant amount of current from entering the triac gate 116 until the time that the voltage appearing at the junction of resistors 102 and 104 is sensed to be sufficiently high to trigger the triac to its switched conducting mode. A condenser 118 is connected across resistor 104 and the energy stored in the condenser at the time of triggering is applied through diac 120 to the gate 116 of the triac and helps to insure positive triggering of the triac. Because of the external capacities, and specifically because of the capacity between the terminals and the gate, a very short duration spike on the power supply can, in some instances, cause a spike to appear on the gate terminal 116 and such could cause a spurious triggering of the triac. Insertion of resistor 130, which is a low resistance value, prevents such spikes from affecting triac operation. If desired, a protective fuse 128, as shown, may be inserted in the power supply.

The operation of the circuit shown in FIG. 3 is as follows: so long as a high impedance which may consist of parts of the human body is sensed at the output terminals 124 and 126 of the outlet, or when there is infinite impedance or the human body or some portion thereof is connected across those terminals, the voltages appearing at the gate 116 are equal to or lower than the voltage which appears on the "Terminal-1" (112) and the triac cannot conduct. Suitable numerical examples of voltages are shown in the figure. The resistance between the two hands of an adult person measure to be, say, about 500,000 ohms when test leads of a conventional analyzer are squeezed between salt water-moistened thumb and index finger of each hand, resulting in an equivalent resistance between the terminals 124 and 126 of about 43,000 ohms. As a result of the presence of resistance 130 there occurs a voltage of about 11.4 volts at "Terminal-1" (112) and at the gate. In this case the triac will not conduct. In contrast with this, when a 25-watt light bulb is plugged into the outlet terminals, a resistance to ground at terminal 112 and the gate 116 of about 400 ohms is sensed. At this point the voltage across resistor 108 is momentarily reduced to a fraction of a volt. This triggers the diac which in turn triggers the triac which thereafter shows a voltage drop of a fraction of a volt.

The resistance-capacitance values and voltage appearing in the figure are approximate values to those used and observed in experimental apparatus.

Figure 4:
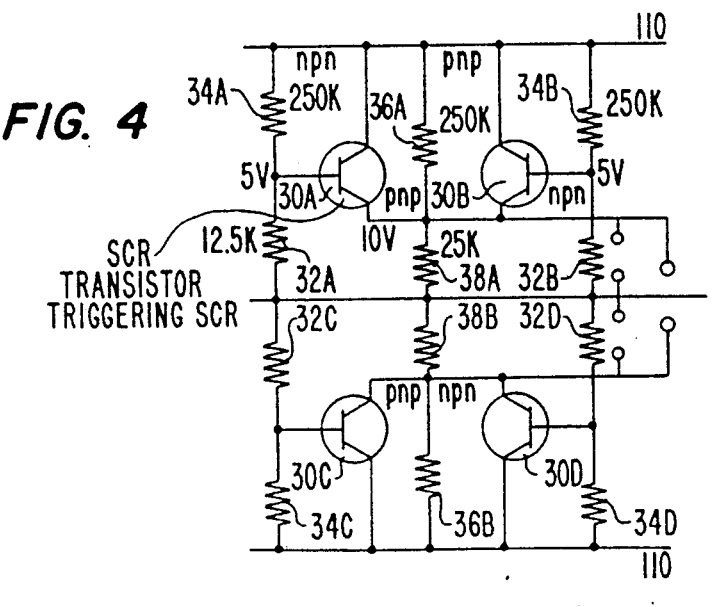

Referring to the before-described FIG. 4, a further transistor version embodying a "symmetrical to ground" output is shown. The transistors in this circuit can be replaced by non-linear devices such as those described in connection with FIG. 3.

In practice, it is to be understood that these circuits may be formed on chips or in very small packages and made integral with the outlet itself or can be made in the form of kits to be added to existing mains outlet terminals, extension cords, etc.

The "safe outlet" of the invention, as before explained in connection with the embodiments of FIGS. 1–4, uses a solid-state electronic circuit to insure that in an "idle" condition only a low voltage that is a small fraction of the full mains supply voltage—say in the order of 10 to 20 Volts—appears at the outlet. Only when a suitable appliance load is plugged into the outlet will the full mains voltage be automatically applied to the appliance through a low impedance as earlier discussed, and its value is about the same as that which appears on the tracks of an electric "toy" train, which has proven to be harmless. When an "open-circuit" or a high impedance is connected to the output circuit or outlet (such as the human body, wet or dry) the low voltage "idle" condition is applied to the output, obtained from a voltage divider connected across the 110 V (or 220 V) "mains" and applied to the output circuit of the outlet, preferably with the aid of "optotriac" switching devices later described.

When the low impedance of an appliance to be energized is connected to the output circuit, the "optotriac" of FIG. 5 is switched off and a "TRIAC" is activated which connects the output circuit of the outlet directly to the 110 V (or 220 V) mains When the low impedance is replaced by a high impedance or an open circuit condition, however, the outlet returns to the "idle" condition.

It may be helpful to review representative values, some of which were before discussed and which may be connected to the outlet. For ease of computation, assume that the "mains" voltage is 100 V. A 100 W light bulb would draw 1 Ampere and have an impedance of 100 ohms. A 10 W bulb would draw 1/10 Ampere and have an impedance of 100 ohms. A 100 W heater would draw 10 Amperes and have an impedance of 1000 ohms. A 1000 W heater would draw 10 Amperes and have an impedance of 10 ohms. Similar impedance conditions occur when "partially inductive" loads such as a motor-driven electric hand-drill appliance is plugged in. The current-sensing circuit of FIG. 5 is particularly designed for such inductive loads as before mentioned.

In contrast to this, some resistance values measured on adult test persons on the "x 1000 scale" of a "20,000 ohms per volt" multimeter for "hand to hand" resistance, were of the order of 2,000,000 ohms on "dry" thumbs and forefingers clasping the two test probes, and 500,000 ohms after they were wetted in salt water. For children, measurements of the order of 500,000 ohms "dry" and 250,000 ohms after wetting with salt water are expected. Thus, there is a vast difference in the impedance of humans and appliances-to-be-powered as previously described.

While the circuits above discussed are admirably suited for resistive loads, there are occasions where it is deirsed to extend operation to special types of inductive loads, such as certain types of motors as in hair dryers, air conditioners, hand tools and the like, and devices using input transformers, all of which may introduce phase angles in the voltage-comparison circuit of FIGS. 1–4. In order to eliminate such phase dependency of the device, the AC voltage or current which will be used to determine the circuit impedance may be rectified so that only the absolute values of these AC vectors will be used for the measurement determination of the circuit impedance.

It should be noted that in all cases the invention is based on the determination of the impedance connected between the outlet terminals, which, in the embodiment of FIGS. 1–4, has been effected by measuring the voltage across parts of the circuit. As an alternative, the impedance may be determined by measuring the current drawn by the load or appliance connected to the outlet terminals and this can be done since the voltages at the mains supply are generally maintained to close limits. Thus, in FIG. 5, such a current-measuring impedance monitoring circuit is shown particularly adapted for all types of inductive loads as well as resistive loads.

Referring to the embodiment of FIG. 5 underlying the present invention, the construction employs a high "step-up-(1000:1) toroid transformer T and an integrated trigger circuit $U_1$, as of the type LM1851 commercial ground protection units. Power to operate the integrated circuit and the other control circuits is derived from the input AC power through resistor $R_3$ and rectifying diode $D_1$; and condenser $C_1$ is used to "smooth out" the rectified AC.

Any current through the toroid transformer T will cause a voltage to appear at the "input" terminals "$-IN$" (2) and "$+IN$" (3) of integrated circuit $U_1$. If the load which is connected to the outlet ("JACK") consists of an open circuit or a very high impedance, then the output of the toroid transformer, which is applied to terminals "2" (-IN) and "3" ($+IN$) is either zero or very small. Under those conditions, the integrated circuit $U_1$ connects its terminal "1" (TRIGGER—"TRIG") to terminal "4" (GROUND—"GRND"). Thus, the voltage which appears at the junction of $R_9$ and $D_2$ is zero or negligible. What this does to the condition of "optotriacs" #1 and #2 will be discussed later.

When a low impedance is connected to the outlet's output of the outlet (JACK) a high AC voltage will appear on terminals #2 and #3 of $U_1$. During those periods in which this voltage exceeds the "threshold" voltage, the connection between terminals "1" (TRIG) and "4" (GRND) is broken and condenser $C_2$ is charged through resistor $R_9$ and diode $D_2$. In each AC sinewave voltage, there are two points in time in which the voltage is zero. At these points in time and in the time intervals surrounding them, the voltage at terminals #2 and #3 drops below the "threshold" value, and the connection between terminals #1 and #4 is re-established during those periods. Therefore, the voltage at the junction of $R_9$ and $D_2$ becomes zero or negligible. However, diode $D_2$ prevents condenser $C_2$ from discharging during those periods. Thus, when the current into the load exceeds the threshold value, a charge is maintained on condenser $C_2$. What effect this has upon the condition of later-described switching "optotriacs" OT1 and OT2 will be discussed later.

The threshold current, described above, can be determined in part by resistor $R_{10}$, while the time duration during which the current must exceed threshold current is determined by capacitor $C_6$. In parallel to the output there is a pilot light which lights up when the unit is in a "high voltage" mode of operation.

At this point, the control circuits which are in operation during "idle" and "high voltage" modes of operation will be described. During the "idle" periods there is no voltage on condenser $C_2$. Thus there is no voltage applied to transistor $Q_2$, the base of which is connected to the junction of resistors $R_8$ and $R_{12}$, and it cannot operate. This shuts off the main path for energizing "optotriac" OT2. There remains a path through $R_6$, the LED in "optotriac" OT2 (shown to right therein) and resistors $R_7$ and $R_{11}$. However, the impedance of this path is so high that the current is far below the value which is needed to light the LED in OT2 and to cause it to operate. This current, however, is sufficient to operate transistor $Q_1$, the base of which is connected to the junction of resistors $R_7$ and $R_{11}$. This in turn causes "optotriac" OT1 to operate and connects the output circuit of the outlet to the voltage divider formed by resistors $R_1$ and $R_2$ (about 10-20 Volts).

When a load impedance is connected to the outlet (JACK), a voltage will appear on condenser $C_2$. This voltage, through the voltage divider $R_8$ and $R_{12}$, will cause transistor $Q_2$ to operate and cause "optotriac" OT2 to operate, completing the circuit into terminal #3 of a mains voltage switch "TRIAC", thereby energizing the TRIAC and, through it, connecting the output of the outlet (JACK) to the full mains voltage. While this takes place, the voltage across $Q_2$ is negligible such that it cannot operate; and "optotriac" OT1 is switched to the "OFF" condition. When the low load impedance is removed, the "idle" condition is re-established.

Outlets, using the principles of operation as described above, can be designed for different current ranges. Prototype units have handled about 6 amperes and they fit in a standard outlet box. Suitable components used are presented in FIG. 5.

As before-mentioned, the safe outlet functions of the invention may also be incorporated into conventional ground fault detector systems to render safe any leakage current and other unsafe conditions that may occur therein. This can be a useful synergistic combination since the "safe outlet", by itself, does not provide protection against ground faults or against "grounded neutral" faults. Prior art circuits which enable this kind of protection are illustrated in FIG. 6, providing conventional "Ground Fault Interrupter" and "Grounded Neutral Detection" functions as described, for example, in "Industrial Blocks", p. 9-100 of the current National Semi-Conductor Application Handbook.

To provide a minimum of "redesign" work, in combining both the protection of the "safe-outlet" system of the present invention and that of the "Ground Fault Interrupter" systems, a novel combination of FIGS. 5 and 6 has been effected as shown in FIG. 7. Regarding "grounded neutrals", it should be noted that the "neutral" wires (so-labelled in FIGS. 6 and 7) which lead from the local power distribution boxes to the outlets are generally connected to a common "ground" G. This ground may be a conducting rod driven into the ground-water levels though in many cases a connection to the metallic "water-mains" pipes is used. When the "on-off" switch of an appliance at the OUTLET, FIG. 7, is in the "off" condition, the "neutral" lead of any appliance should present an open circuit. If there is a fault in the neutral and ground wire system, a loop is completed via the "neutral" wire, the connection with the "ground" wire at the power distribution point, the "ground" wire and the fault in the appliance.

To detect this fault, as shown in FIGS. 6 and 7, a 120 $H_z$ voltage, so-labelled, is inserted in the "neutral" and "hot" wire through the ground neutral coil or transformer $T_2$, as is well known. If there is a neutral-to-ground fault, it will cause a current to flow. During those periods when the appliance-power switch is in the "off" position, the field caused by an opposing current in the "Hot" lead is not present, and a voltage is generated in the sensing Transformer $T_3$. This, in turn, appears at terminals "2" and "3" of the integrated circuit LM1851 and causes a voltage at its "trigger output" #"1" (FIG. 6). This in turn will energize the "SCR", FIG. 6, through the "Switch Control" circuits, so-labelled, in conventional fashion, causing the circuit breaker $S_1'$ to release and to stay in this condition until reset manually. The same sequence of events will occur when the switch in the appliance is in the "ON" condition and leakage currents occur. In that case, the currents in the "Hot" and "Neutral" circuits do not balance each other and this cuases the circuit breaker to release and stay released. If no "ground-fault" or "neutral to ground" fault is detected, the full voltage will appear at the "Hot" and "Neutral" terminals.

In providing in FIG. 7 the combined protection of the "safe-outlet" circuits of the present invention and that of the conventional "Ground Fault Interruption" and "Neutral to Ground Fault Interruption" circuits of FIG. 6, and with a minimum of change, the "circuit interrupter" circuits of FIG. 6 are shown connected to the "mains", and the "safe-outlet" circuits are connected to its output to supply the protected outlet. As before described, the switch control circuits of FIG. 5 will provide an "off" condition at point I in FIG. 7 by the optical-insulated "TRIAC", and with contacts "open" when delivering power; and at point II, contacts open in the idle condition and closed by "TRIAC" when delivering power.

Further modifications will occur to those skilled in this art and such are considered to fall within the spirit and scope of the invention as defined in the appended claims.

What is claimed is:

1. A method of rendering an outlet having terminals connected to a mains power supply of predetermined supply voltage safe from shock upon human touching of the outlet terminals, that comprises, current-sensing whatever impedance may be presented between said terminals; responding to said sensing to apply only a fraction of said predetermined supply voltage from said supply for current-sensed impedance values corresponding to the relatively high impedance presented by the human body, wet or dry, or by animals; and responding to said current-sensing to apply substantially full predetermined supply voltage for current-sensed impedance values corresponding to the relatively low impedance presented by appliances, including those presenting inductive loads.

2. A method as claimed in claim 1 and in which said fraction of said predetermined supply voltage is adjusted to the order of about 10-20 volts.

3. A method as claimed in claim 1 and in which said fraction of said predetermined supply voltage is applied during current-sensing of impedance values between the outlet terminals ranging from infinity down to said relatively high impedance presented by the human body.

4. An outlet having terminals for applying predetermined supply voltage from mains power supply lines to the outlet terminals having, in combination, an impedance-measuring current-sensing electronic circuit interposed between the supply lines and the outlet terminals and comprising electronic switching means to prevent any more than a fraction of said predetermined supply voltage from being applied to said outlet terminals when the impedance presented thereacross is of the relatively high impedance values presented by the human body, and means responsive to said current-sensing and automatically operable upon the presenting between said outlet terminals of the relatively low impedance values of appliances, including those with inductive loads, for causing the switching means to apply thereto substantially full predetermined supply voltage from said supply lines.

5. An outlet as claimed in claim 4 and in which said switching means comprises triac means controlled by optotriac means responsive to the current-sensed impedance at said outlet terminals.

6. An outlet as claimed in claim 5 and in which the control of the optotriac means is effected by step-up toroid transformer means.

7. An outlet as claimed in claim 4 and in which the current-sensing circuit comprises means for rectifying the mains supply voltage so that only the absolute values of the AC vectors of the mains voltage are used for the measurement of said impedance.

8. An outlet as claimed in claim 4 and in which means is provided for connecting the same with ground fault detector circuit means.

9. An outlet as claimed in claim 8 and in which the ground fault detector circuit means is provided with circuit interrupter means connected to the said mains supply and with the output thereof connected to supply power to the said current-sensing circuit, the output of which is used for the combined outlet-ground fault detector as the terminals to which appliances and other loads-to-be-powered are connected.

* * * * *